US011426968B2

(12) United States Patent
Ravise et al.

(10) Patent No.: US 11,426,968 B2
(45) Date of Patent: Aug. 30, 2022

(54) ASSEMBLY CONSTITUTING AN ACOUSTICALLY ABSORBENT MATERIAL

(71) Applicant: Airbus Operations (S.A.S.), Toulouse (FR)

(72) Inventors: Florian Ravise, Saint-Herblain (FR); Florent Mercat, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 386 days.

(21) Appl. No.: 16/828,302

(22) Filed: Mar. 24, 2020

(65) Prior Publication Data

US 2020/0316900 A1 Oct. 8, 2020

(30) Foreign Application Priority Data

Apr. 2, 2019 (FR) ........................................ 1903515

(51) Int. Cl.
*B32B 3/12* (2006.01)
*G10K 11/168* (2006.01)
*B32B 3/26* (2006.01)

(52) U.S. Cl.
CPC ................ *B32B 3/12* (2013.01); *B32B 3/266* (2013.01); *G10K 11/168* (2013.01); *B32B 2307/102* (2013.01); *G10K 2210/107* (2013.01); *G10K 2210/1281* (2013.01)

(58) Field of Classification Search
CPC ..... B32B 3/12; B32B 3/266; B32B 2307/102; G10K 11/168; G10K 11/172; G10K 2210/107; G10K 2210/1281; F02K 1/827; F02C 7/045; E04C 2/365; B64D 2033/0206; Y10T 428/24149; Y10T 428/24165
See application file for complete search history.

(56) References Cited

U.S. PATENT DOCUMENTS 2,870,857 A * 1/1959 Goldstein ................. E04B 9/32
428/116
3,948,346 A    4/1976 Schindler
4,298,090 A   11/1981 Chapman
(Continued)

FOREIGN PATENT DOCUMENTS

FR         2 445 436 A1      7/1980

OTHER PUBLICATIONS

French Search Report for Application No. 1903515 dated Jan. 8, 2020.

*Primary Examiner* — Catherine A. Simone
(74) *Attorney, Agent, or Firm* — Jenkins, Wilson, Taylor & Hunt, PA

(57) ABSTRACT

An assembly constituting an acoustically absorbent material and including a first panel, a second panel pierced with holes, an intermediate panel pierced with through-holes and arranged between the first panel and the second panel, a first structure between the first panel and the intermediate panel and including first cages, a second structure between the second panel and the intermediate panel and including second cages, and for each through-hole of the intermediate panel, a tube opening out at the two ends thereof, where one of the ends of the tube is fixed to the intermediate panel at the through-hole, and where the other end of the tube is accommodated inside a first cage. Such an assembly makes it possible to obtain broad-band attenuation and is easy to manufacture.

4 Claims, 1 Drawing Sheet

(56) References Cited

U.S. PATENT DOCUMENTS

| | | | | |
|---|---|---|---|---|
| 4,421,811 A | * | 12/1983 | Rose | B32B 3/12 |
| | | | | 428/193 |
| 4,743,740 A | * | 5/1988 | Adee | B64D 15/00 |
| | | | | 219/547 |
| 6,619,913 B2 | * | 9/2003 | Czachor | F01D 21/045 |
| | | | | 415/173.1 |
| 9,514,734 B1 | | 12/2016 | Jones et al. | |
| 2019/0301370 A1 | * | 10/2019 | Joshi | E04B 1/74 |

* cited by examiner

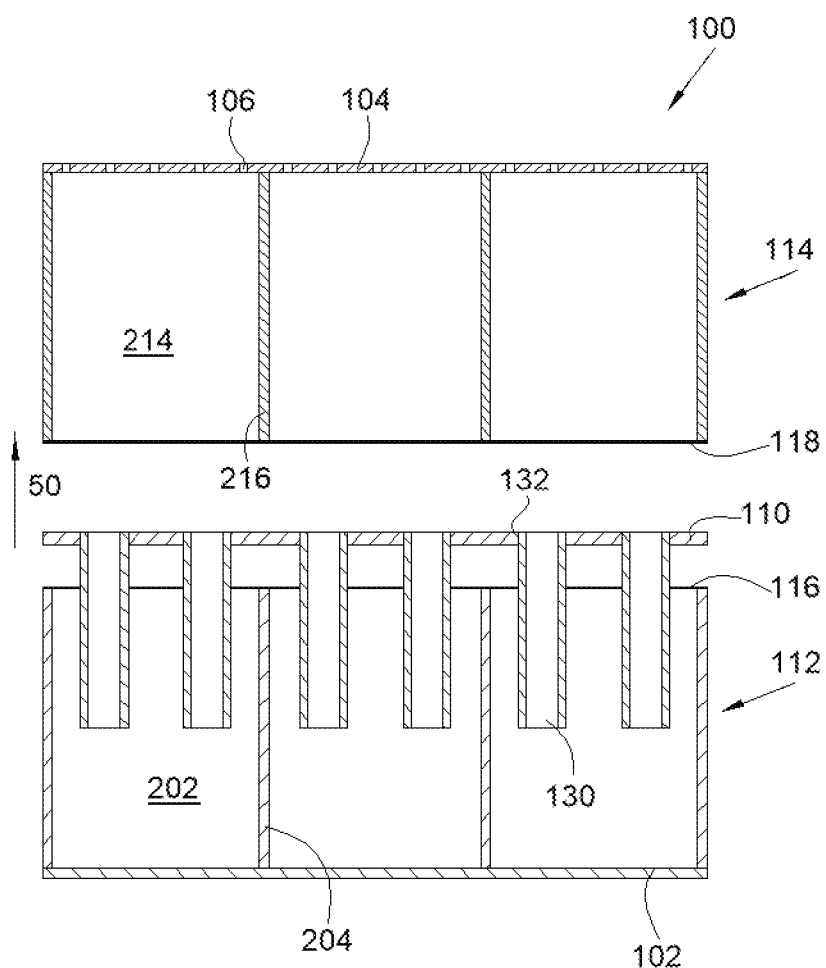

ASSEMBLY CONSTITUTING AN ACOUSTICALLY ABSORBENT MATERIAL

CROSS-REFERENCE TO RELATED APPLICATION

This application claims priority to French patent application number 19 03515 filed on Apr. 2, 2019, the entire disclosure of which is incorporated by reference herein.

TECHNICAL FIELD

The disclosure herein relates to an assembly constituting an acoustically absorbent material.

BACKGROUND

During operation, an aircraft engine generates noise. This engine is accommodated in a nacelle and, with a view to attenuating this noise, it is known to install assemblies constituting an acoustically absorbent material around the engine in the structure of the nacelle.

Such assemblies constituting an acoustically absorbent material have, for example, the form of honeycomb structures. Such a honeycomb structure comprises two parallel panels, one of which is perforated, and between which are arranged hexagonal cells juxtaposed relative to one another.

It is also known, in other applications, to use truncated cones that are placed in cavities.

Although, from an acoustic standpoint, such assemblies offer satisfactory results, it is desirable to seek an assembly constituting an acoustically absorbent material that makes it possible to attenuate a plurality of acoustic frequencies and that is easy to manufacture.

SUMMARY

An object of the subject matter herein is to disclose an assembly constituting an acoustically absorbent material that is able to attenuate a plurality of acoustic frequencies and that is easy to manufacture.

To that end, an assembly is disclosed constituting an acoustically absorbent material and comprising:
  a first panel;
  a second panel pierced with holes;
  an intermediate panel pierced with through-holes and arranged between the first panel and the second panel;
  a first honeycomb structure extending between the first panel and the intermediate panel and comprising first cages;
  a second honeycomb structure extending between the second panel and the intermediate panel and comprising second cages; and
  for the intermediate panel, and for each through-hole of the intermediate panel, a tube opening out at the two ends thereof, where one of the ends of the tube is fixed to the intermediate panel at the through-hole, and where the other end of the tube is accommodated inside a first cage.

Such an assembly makes it possible to obtain broad-band attenuation and is easy to manufacture.

Advantageously, at least two tubes have different lengths.

Advantageously, the intermediate panel, the second panel and the tubes are produced from acoustically rigid materials.

BRIEF DESCRIPTION OF THE DRAWING

The above-mentioned features of the disclosure herein, and also others, will become more clearly apparent upon reading the following description of an example embodiment, the description being given in relation to the appended drawing, in which FIG. 1 is a sectional, expanded view of an assembly constituting an acoustically absorbent material according to the disclosure herein.

DETAILED DESCRIPTION

FIG. 1 shows an assembly 100 constituting an acoustically absorbent material according to the disclosure herein. The assembly 100 comprises a first panel 102 and a second panel 104 that are at a distance from one another. One of the panels, in this case the second panel 104, is pierced with holes 106 that traverse the panel in order to allow the passage of acoustic waves.

An intermediate panel 110 is arranged between the first panel 102 and the second panel 104. The three panels 102, 104 and 110 are parallel.

A first honeycomb structure 112 extends between the first panel 102 and the intermediate panel 110 and a second honeycomb structure 114 extends between the second panel 104 and the intermediate panel 110.

Thus, according to a stacking direction 50, the assembly 100 comprises, in succession, the first panel 102, the first honeycomb structure 112, the intermediate panel 110, the second honeycomb structure 114 and the second panel 104.

The first structure 112 comprises a succession of first cages 202, where each first cage 202 is hollow and is delimited by walls 204 extending in planes parallel to the stacking direction 50. In a preferred manner, each first cage 202 delimits a hexagonal cell, but other forms may be envisioned.

Similarly, the second structure 114 comprises a succession of second cages 214, where each second cage 214 is hollow and is delimited or defined by walls 216 extending in planes parallel to the stacking direction 50. In a preferred manner, each second cage 214 delimits or defines a hexagonal cell, but other forms may be envisioned.

The first panel 102 and the first structure 112 are fixed to one another, for example by adhesive bonding, welding, etc.

The second panel 104 and the second structure 114 are fixed to one another, for example by adhesive bonding, welding etc.

The first structure 112 and the intermediate panel 110 are fixed to one another, for example by adhesive bonding, welding, etc. The reference 116 shows a cross-linked adhesive sheet.

The second structure 114 and the intermediate panel 110 are fixed to one another, for example by adhesive bonding, welding, etc. The reference 118 shows a cross-linked adhesive sheet.

The second structure 114 with the second panel 104 and the intermediate panel 110 form a quarter-wave resonator that attenuates the acoustic high frequencies. The assembly 100 thus makes it possible to obtain broad-band attenuation and is easy to manufacture.

The assembly 100 also comprises, for each first cage 202, at least one tube 130 opening out at the two ends thereof and extending in a direction parallel to the stacking direction 50.

One of the ends of each tube 130 is fixed to the intermediate panel 110 at a through-hole 132 that the panel has for this purpose and that traverses the panel. There is thus a fluidic continuity between a second cage 214 and a first cage 202 via the tube 130. The tubes 130 are fixed to the intermediate panel 110, for example by welding, adhesive bonding, etc.

The other end of each tube 130 is accommodated inside the first cage 202 and opens out therein.

The first structure 112, with the first panel 102, the intermediate panel 110 and the tubes 130 form a Helmholtz resonator that attenuates the acoustic low frequencies. The frequency that is attenuated within the first structure 112 depends, inter alia, on the number of tubes 130 per first cage 202, on the diameter of the tubes 130 and on the length of the tubes 130.

Thus, in order to attenuate a broader frequency spectrum, the lengths of the tubes 130 are different from a first cage 202 to another. That is to say that at least two tubes 130 have different lengths.

According to an embodiment, the inside diameter of each tube is between 0.5 mm and 3 mm and the length of the tubes 130 may vary between 10 and 25 mm, for example. In the case of an aircraft engine and according to a particular embodiment, the second panel 104 is pierced with a level of perforations of the order of 6 to 8% in the case of an air intake and of the order of 13 to 15% in the case of a thrust reverser.

The various elements constituting the assembly 100 may be produced from different materials such as, for example, metallic materials such as aluminium or an aluminium alloy, or composite materials. The method for fixing the elements together will likewise depend on the materials used.

The intermediate panel 110, the second panel 104 and the tubes 130 are produced from acoustically rigid materials, i.e. they do not deform through the effect of the acoustic waves. On the other hand, the intermediate panel 110, the second panel 104 and the tubes 130 are produced from mechanically deformable or flexible materials so that it is possible to apply them over double curves.

According to an embodiment, the height of the second structure 114 is of the order of 25 mm in order to attenuate frequencies of interest within the context of an aircraft engine and the height of the first structure 112 is of the order of 15 mm.

A method for manufacturing the assembly 100 is simple and comprises: a first supply step, during which the intermediate panel 110 with the through-holes 132 and the tubes 130 are provided;

a first assembly step during which a tube 130 is fixed to the intermediate panel 110 at each through-hole 132;

a second supply step during which the first panel 102 and the first structure 112 thus assembled are supplied;

a second assembly step during which the intermediate panel 110 is fixed to the first structure 112;

a third supply step during which the second panel 104 and the second structure 114 thus assembled are supplied;

a fourth assembly step during which the intermediate panel 110 is fixed to the second structure 114.

Where the second structure 114 is adhesively bonded to the intermediate panel; the cross-linked adhesive sheet is not present at the through-holes 132 in order to prevent blocking of the tubes 130.

While at least one example embodiment of the invention (s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly constituting an acoustically absorbent material and comprising:
    a first panel;
    a second panel pierced with holes;
    an intermediate panel pierced with through-holes and arranged between the first panel and the second panel;
    a first honeycomb structure extending between the first panel and the intermediate panel and comprising first cages;
    a second honeycomb structure extending between the second panel and the intermediate panel and comprising second cages; and
    for the intermediate panel, and for each through-hole of the intermediate panel, a tube opening out at two ends thereof, where one of the ends of the tube is fixed to the intermediate panel at the through-hole, and where another end of the tube is inside a first cage.

2. The assembly according to claim 1, wherein at least two tubes have different lengths.

3. The assembly according to claim 2, wherein the intermediate panel, the second panel and the tubes comprise acoustically rigid materials.

4. The assembly according to claim 1, wherein the intermediate panel, the second panel and the tubes comprise acoustically rigid materials.

* * * * *